July 4, 1933.  S. J. PEHRSSON  1,916,850
HAND TRUCK
Filed Nov. 30, 1928   2 Sheets-Sheet 2
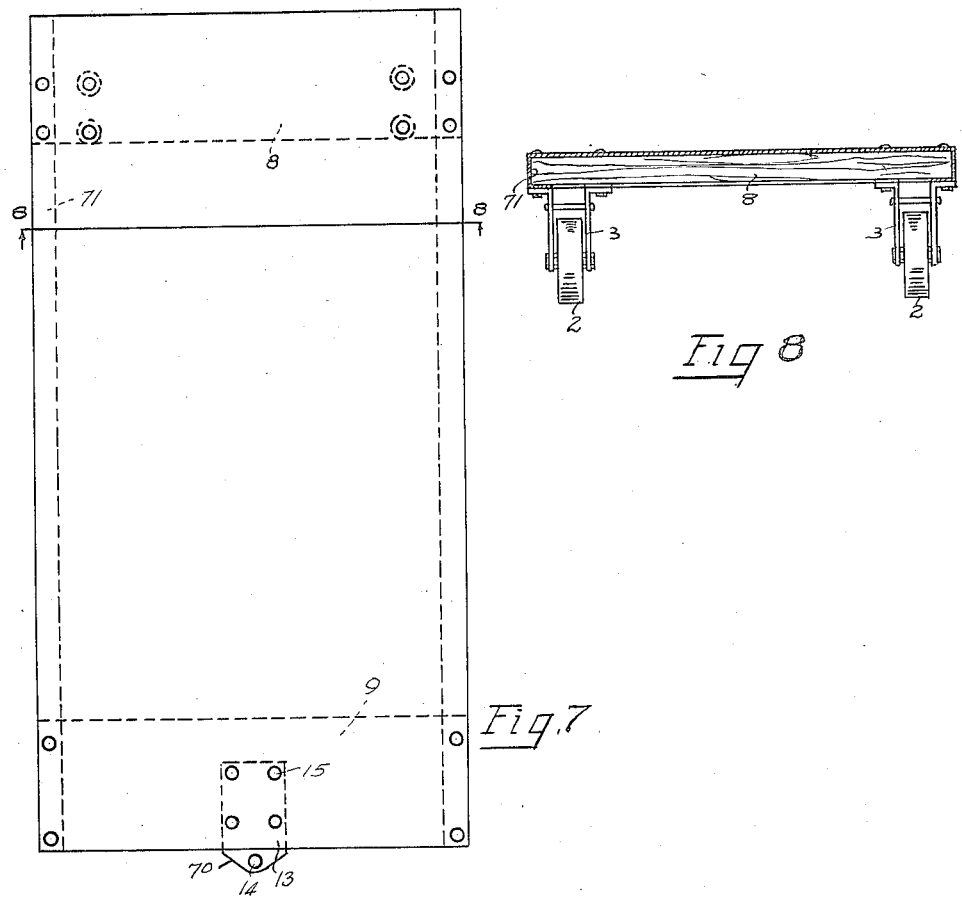
Inventor
Sven Johan Pehrsson
By Frank M. Slough
his Attorney Patented July 4, 1933

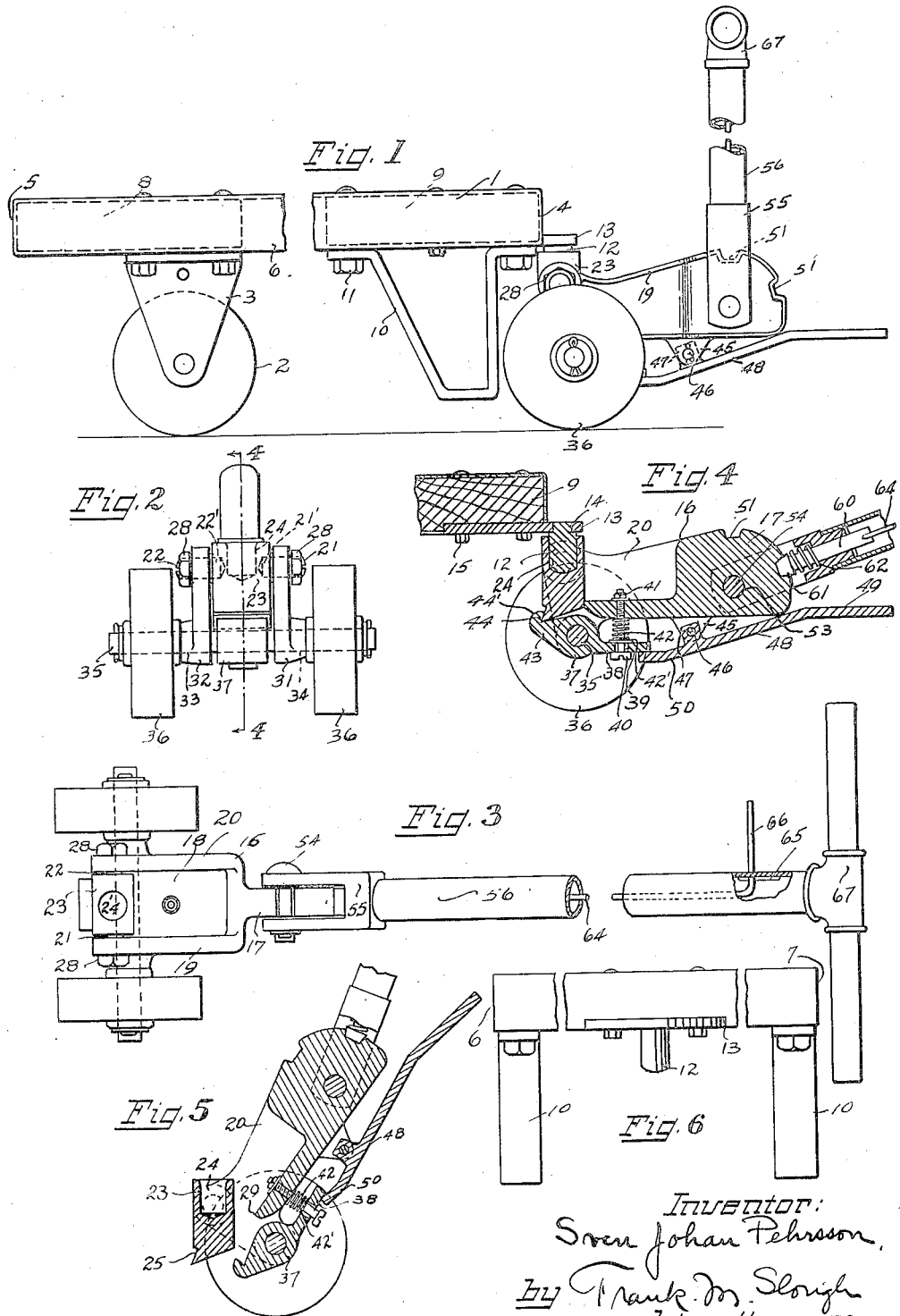

1,916,850

UNITED STATES PATENT OFFICE

SVEN JOHAN PEHRSSON, OF ELYRIA, OHIO, ASSIGNOR TO THE COLSON COMPANY, OF ELYRIA, OHIO, A CORPORATION OF OHIO

HAND TRUCK

Application filed November 30, 1928. Serial No. 322,649.

My invention relates to trucks and more particularly to a type of hand truck adapted to be used about warehouses or the like.

An object of my invention is to provide a hand truck wherein the forward wheels act as a jack and are removable.

Another object of my invention is to provide a platform truck having removable front wheels that may be used under other platforms.

Another object of my invention is to provide an improved means of automatically locking the wheel jack to the platform when it is desired to move the platform.

Another object of my invention is to provide a device of the class described of novel and improved construction that is economical to manufacture.

Another object of my invention is to provide a platform truck jack which will stand alone when not attached to the platform.

Another object of my invention is to provide a truck of the class described wherein a number may be disposed in a small storage space.

These and other objects of my invention and the invention itself will become more apparent from the following description, wherein reference will be had to the accompanying drawings forming a part of this specification.

In the drawings:

Fig. 1 shows in side elevation the fragments of a platform truck and a lift jack, certain parts of the handle being broken away;

Fig. 2 is an end elevational view of the jack with part of the handle broken away;

Fig. 3 is a plan view of the jack and a portion of the platform truck;

Fig. 4 is a vertical medial sectional view of the front wheel assembly attached to the end of the platform truck;

Fig. 5 is a vertical medial sectional view of the lift jack in a position about to be operated;

Fig. 6 is an end view of the platform, certain parts being broken away;

Fig. 7 is a plan view of the platform truck; and

Fig. 8 is a view taken on the line 8—8 of Fig. 7.

Referring to the drawings wherein like parts are designated by like reference characters, at 1 I show a platform truck preferably formed of sheet metal having ends 4 and 5 bent downward. The sides 6 and 7 are bent downward and then inward to form channels. Wooden cleats 8 and 9 are placed in the channels 71 to provide a base for the attaching of a pair of wheels 2 by yokes 3 at one end of the platform. Brackets 10 are fastened by bolts 11 to the other end of the platform to form legs. Platform trucks of this general construction comprising a platform supported at one end by wheels and at the other end by stationary supports are sometimes referred to in this art as semi-skids.

Intermediate the brackets 10 on one end of the platform, is provided a plate 13 having a substantially cylindrical lug 12 depending therefrom. The lug is attached to the plate by a reduced end 14 inserted in an aperture in the bracket, the plate being held by bolts 15 to the platform. The lug may be headed over or welded to the plate to maintain the same in a rigid position.

The truck jack comprises a Y-shaped frame 16, Fig. 3, having a narrow rear portion 17 and a wide channel shaped front portion 18. The upwardly extending side portions 19 and 20 of the channel pivotally support therein a block 23 by a pair of screws 21 and 22, having smooth reduced ends 21' and 22' inserted in apertures disposed on opposite sides of the block. The block is of generally trapezoidal cross-section, and is provided with a notch 25 extending across its forward face adjacent the lower edge. A substantially cylindrical recess 24 is provided extending into the upper part of the block along its longitudinal axis. The ends of the screws fit loosely within the block, so that the block is free to rotate thereon, and are provided with lock nuts 28 to retain them in fixed adjustment.

The bottom of the channel frame is relieved at 29 to provide space for the block 23 to pivot freely. The sides of the frame extend downward at their forward portions to form a pair of bearing bosses 31 and 32 which are provided with axially aligned bores 33 and 34 adapted to receive therein a shaft 35. A pair of wheels 36 are rotatably journalled upon the shaft and held by cotter keys or the like.

On the shaft, intermediate the bearings 31 and 32, and suspended below the block 23, is a lever 37, which has a rearwardly extending arm 38 provided with an aperture 39. The forward end 43 of the lever is hook shaped, being provided with a notch 44 extending transversely across its upper surface and adapted to engage the sharp forward edge, formed by the notch 25, of the pivoted block 23.

A screw 40 extends through the aperture 39 in the lever, through a short helical spring 42 and washer 42′, and through a threaded aperture in the bottom channel and is locked by a lock nut 41. The helical spring presses the lever downward against the head of the screw which limits the rotation of the lever.

Integral with the bottom of the truck frame there is provided a pair of downwardly extending lugs 45 which have axially aligned transverse bores that receive a pin 46 which pivotally holds an upwardly extending lug 47 of a lever 48. The forward short end 50 of the lever is adapted to engage the rear end 38 of the lever 37 and the rearwardly extended portion of the lever forms an operating pedal 49.

A handle is provided which comprises a tube 56 having a T-shaped upper end 67, and a yoke 55 on the lower end. The handle is pivotally fastened to the rear end of the truck by a pin 54 which passes through a bore 53 in the truck frame and a pair of axially aligned bores in the arms of the yoke 55.

Means for holding the handle in various tilted positions is provided which comprises a plunger telescoped within a longitudinal bore in the yoke 55. The plunger is provided with an enlarged end 61 and has a helical spring 62, disposed around the stem 60, which bears against the yoke and the shoulder of the plunger formed by the enlarged end and holds the plunger spring pressed against the periphery of the frame. The plunger is adapted to engage notches 51 in the periphery of the frame and prevent relative movement of the handle and frame. A rod 64 is attached to the upper end of the lug and extends upward through the tube forming the handle, and is provided with a bent portion 66 which extends through an elongated slot 65 adjacent the upper part of the handle, which provides suitable means for disengaging the lug from the notches 51 in the frame.

My device is especially adapted to be used where the platform may be left to be loaded while another platform previously loaded is being hauled away. The two-wheeled structure and the front supports provides a platform that may be readily loaded without the same rolling. After the truck is loaded the operator approaches with the jack tilted, as best shown in Fig. 5. The element being in a tilted position lowers the pivotal block so that it may be readily brought under the forward part of the platform and the socket of the block 23 brought in alignment with the downwardly extending lug 12 at the front of the platform. When the handle is lowered to the position, as shown in Fig. 4, the block is raised and the socket 24 engages the lug of the truck and raises the front end of the truck off the floor as best shown in Fig. 1.

When the platform is being raised, the block remains in a vertical position and the lug enters the socket. The lug fits snugly in the socket and prevents rotation of the block 23 when the bottom edge of the block engages the forward curved surface 44′ of the lever 37 and passes over the same until the sharp lower edge of the block snaps into the notch 44 of the lever, wherein the lever holds the block securely against the edge 29 of the bottom of the channel and the notch of the lever. This prevents further pivotal movement of the block.

The platform may now be moved as the front supports are held away from the floor line. When it is desired to remove the jack from the platform, the operator presses the handle downward to relieve the locking pressure between the lever 37 and block 23. The lever 48 is operated by a downward pressure upon the end 49 with the foot which transmits an upward movement to the end 50 of the lever pressing upward the rear end 38 of the lever 37 against the pressure of the spring 42 and disengages the notched end of the lever from the edge of the block 23. Pressure is maintained upon the lever and the handle raised which lowers the pivotal block until it is clear of the lever 43. The supports 10 engage the floor and the downwardly extending lug is disengaged from the socket 24 of the block. The jack may be removed and is ready to engage another truck for operation.

As best shown in Fig. 7, the shape of the bracket 13 is such that when the jack is brought forward, in the position as shown in Fig. 5, for engagement with the platform, the walls 19 and 20 of the channel will engage the curved surface 70 of the bracket so that the pivotal block will become automatically aligned with the depending lug 12. This provides a means whereby the block 23 and lug 11 may be readily aligned for attaching the jack to the platform.

The foregoing arrangement provides a truck wherein a number of platforms may be had while only one of the removable truck elements is necessary. While the platforms are being loaded, the loaded platforms may be carried away or vice versa, the result being a material saving in the outlay of equipment. A number of the platforms may be stored in a very small space.

When the platform is being moved away by means of the removable truck elements or jack, the lug 12 and socket 24 provide a king pin construction on which the jack may swivel with respect to the platform, thus not only rendering it easy to move the truck and turn it in small space, but permitting the manipulation of the truck to position it exactly where it may be wanted for loading or unloading or storing.

Having thus described my invention in a certain embodiment I am aware that numerous and extensive departures may be made from the embodiment herein illustrated and described without departing from the spirit of my invention.

I claim:

1. In a device of the class described, a platform truck having a pair of wheels at one end and a stationary support at the other, a downwardly extending lug attached to the stationarily supported end, a removable jack, said jack comprising in combination a channel frame, a pair of wheels supporting the frame, a handle, socket means adapted to receive the lug on said platform, lever operable means pivotally secured to the said frame adapted to lock said lug receiving means, and means to unlock said lock, said unlocking means comprising a pedal pivotally supported on said frame, said jack being adapted to raise the stationarily supported end of the platform.

2. In a wheeled truck, the combination of a semi-skid and a jack, the semi-skid comprising a platform, a pair of wheels attached to one end thereof and a stationary support at the other end thereof; and the jack comprising a wheel supported frame, and a handle for rocking the frame on the wheel axis, the platform and the jack being each provided with one of a pair of pin and socket coupling elements adapted to be mutually telescopically engaged and disengaged by rocking the jack frame by means of the handle, and the pin and socket elements being relatively movable around a substantially vertical axis when engaged, and the element on the jack being pivotally supported on the frame thereof, means to relatively lock the frame supported one of said elements to the frame to prevent relative rocking movements of said handle, and foot pressure pedal means for relatively unlocking said locking means.

3. In a wheeled truck, the combination of a semi-skid and a jack, the semi-skid comprising a pair of wheels attached to one end thereof and a stationary support attached to the other end thereof and the jack comprising a wheel supported frame, a handle for rocking the frame on the wheel axis; the platform and jack being each provided with one of a pair of pin and socket coupling elements adapted to be mutually telescopically engaged and disengaged by rocking the jack frame by means of its handle, the element on the jack frame being pivotally connected thereto, and means to lock the element against pivoting movement to lock the frame against rocking movement around the wheel axis, and pedal means to release said locking means.

4. In a wheeled truck, the combination of a truck body and a jack, a pair of wheels attached to one end of the body and a stationary support at the other end thereof, the jack comprising a wheel supported frame and a draft tongue for rocking the frame on the wheel axis, the body and the jack each being provided with one of a pair of pin-and-socket coupling elements, the pin-and-socket element on the jack being pivoted on the jack frame to swing to a position to be telescopically aligned with the pin-and-socket element of the truck body, whereby the two pin-and-socket elements may be mutually telescopically engaged and disengaged by rocking movement of the jack frame on its wheel axis, an element on the frame having a portion engageable with a portion of the frame supported pin-and-socket element to lock the frame against rocking on its wheel axis when the pin-and-socket elements are telescopically engaged, a pedal on the frame operable to disengage the engaged locking portions, the jack tongue being pivoted on the frame, locking means associated with the frame and draft tongue to lock them together to cause the frame to be rocked by the tongue, and to unlock them to permit oscillatory movement of the tongue on the frame to facilitate propulsion of the wheeled body and jack.

5. In a wheeled truck, the combination of a truck body and a jack, a pair of wheels attached to one end of the body and a stationary support at the other end thereof, the jack comprising a wheel supported frame and a draft tongue for rocking the frame on the wheel axis, the body and the jack each being provided with one of a pair of pin-and-socket coupling elements, the pin-and-socket element on the jack being pivoted on the jack frame to swing to a position to be telescopically aligned with the pin-and-socket element of the truck body, whereby the two pin-and-socket elements may be mutually telescopically engaged and disengaged by rocking movement of the jack frame on its wheel axis, an element on the frame having a portion engageable with a portion of the frame supported pin-and-socket element to lock the frame against rocking on its wheel axis when the pin-and-socket elements are telescopically engaged, a pedal on the frame operable to disengage the engaged locking portions, the jack tongue being pivoted on the frame, locking means associated with the frame and draft tongue to lock them together to cause the frame to be rocked by the tongue, and to unlock them to permit the tongue to be pivotally moved to a generally vertical position to give access to the pedal.

6. In a wheeled truck, the combination of a truck body and a jack, a pair of wheels attached to one end of the body and a stationary support at the other end thereof, the jack comprising a wheel supported frame and a draft tongue for rocking the frame on the wheel axis, the body and the jack each being provided with one of a pair of pin-and-socket coupling elements, the pin-and-socket element on the jack being pivoted on the jack frame to swing to a position to be telescopically aligned with the pin-and-socket element of the truck body, whereby the two pin-and-socket elements may be mutually telescopically engaged and disengaged by rocking movement of the jack frame on its wheel axis, an element on the frame having a portion engageable with a portion of the frame supported pin-and-socket element to lock the frame against rocking on its wheel axis when the pin-and-socket elements are telescopically engaged, a pedal on the frame operable to disengage the engaged locking portions, the jack tongue being pivoted on the frame, locking means associated with the frame and draft tongue to lock them together in a plurality of positions and in one position to cause the frame to be rocked by the tongue and in another position to dispose the tongue in a vertical position of disuse, and to unlock them to permit oscillatory movement of the tongue on the frame to facilitate propulsion of the wheeled body and jack and to permit disposing the tongue in an elevated position to give access to the pedal.

In testimony whereof I hereunto affix my signature this 1st day of November, 1928.

SVEN JOHAN PEHRSSON.